(No Model.) 8 Sheets—Sheet 1.
G. B. DURKEE.
MACHINE FOR FORMING CHECK ROWER WIRES.
No. 291,584. Patented Jan. 8, 1884.
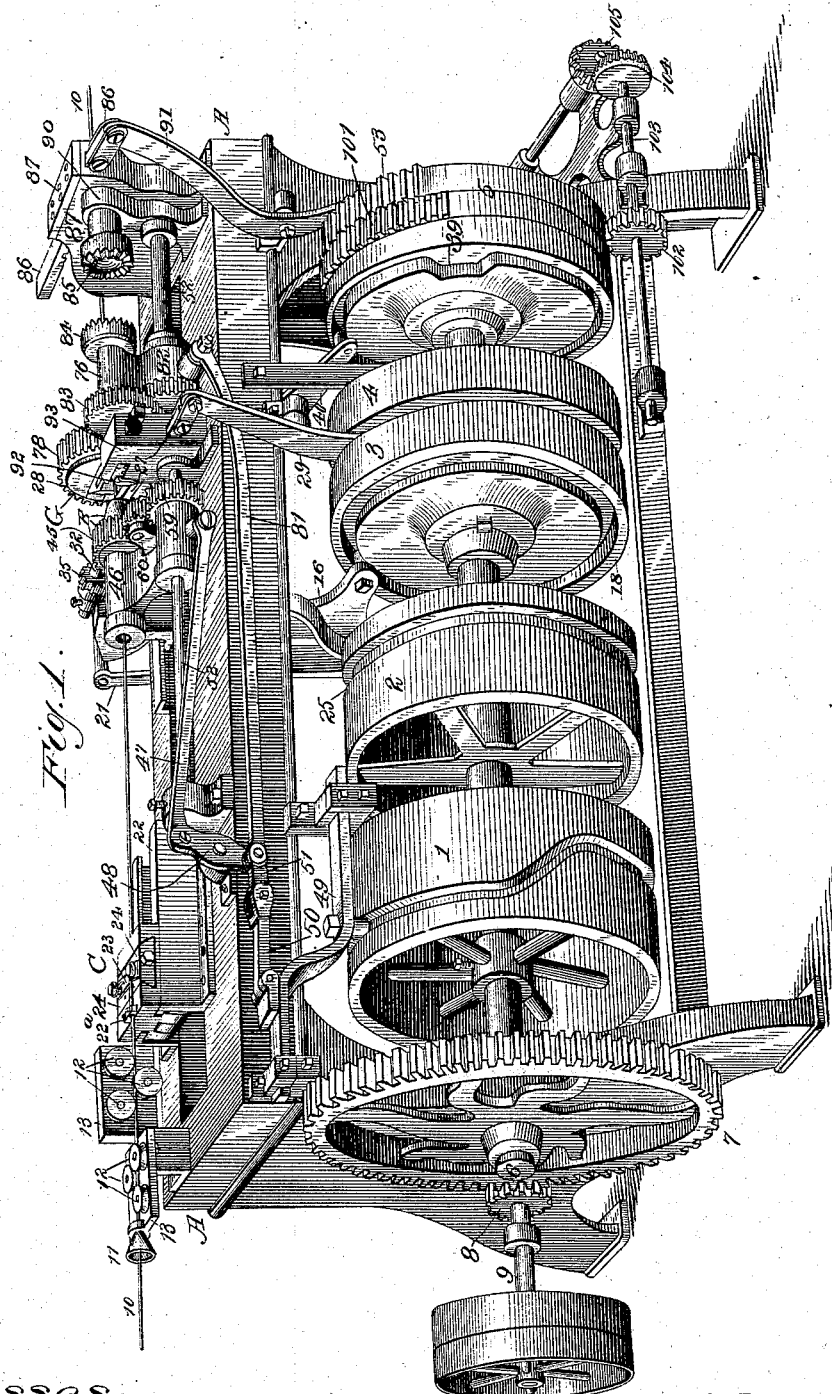

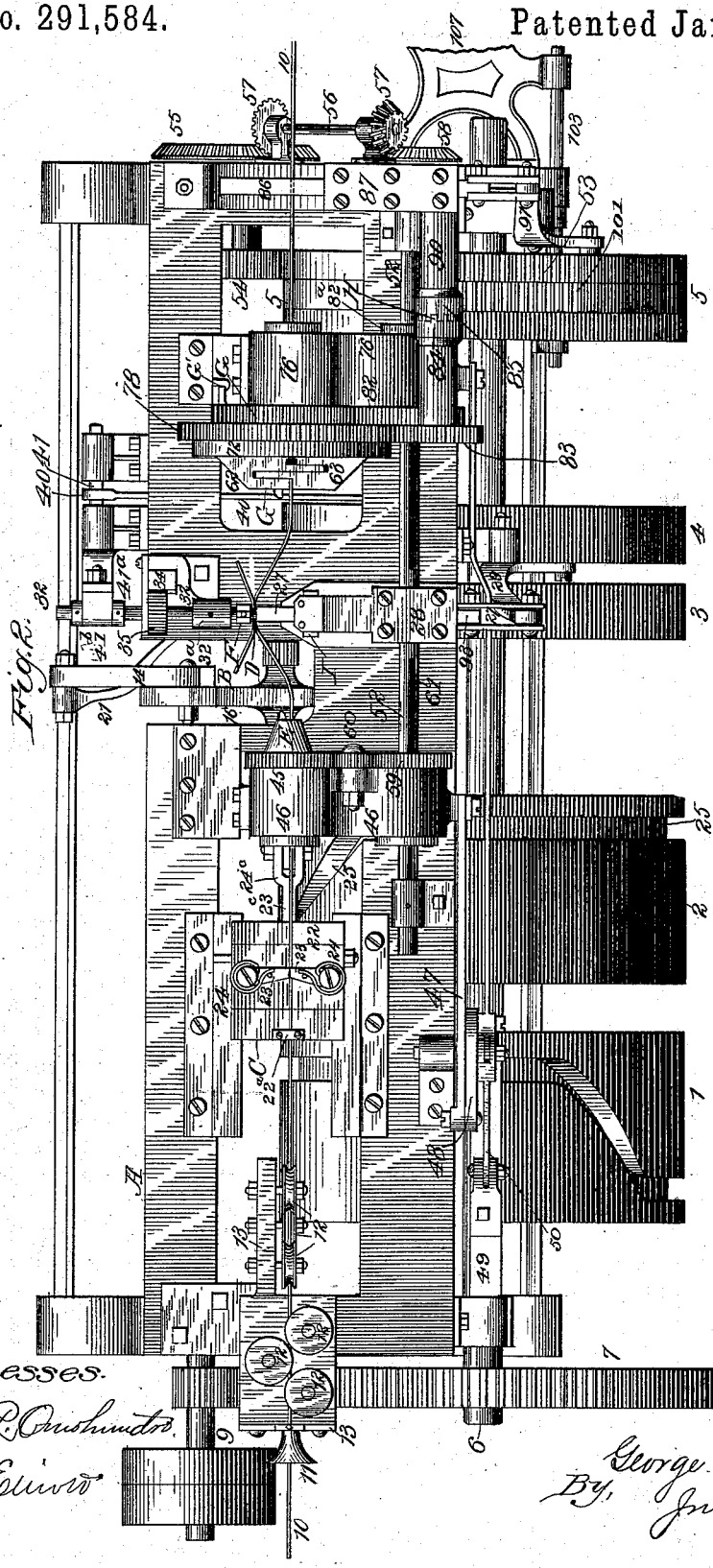

(No Model.) 8 Sheets—Sheet 3.
G. B. DURKEE.
MACHINE FOR FORMING CHECK ROWER WIRES.
No. 291,584. Patented Jan. 8, 1884.
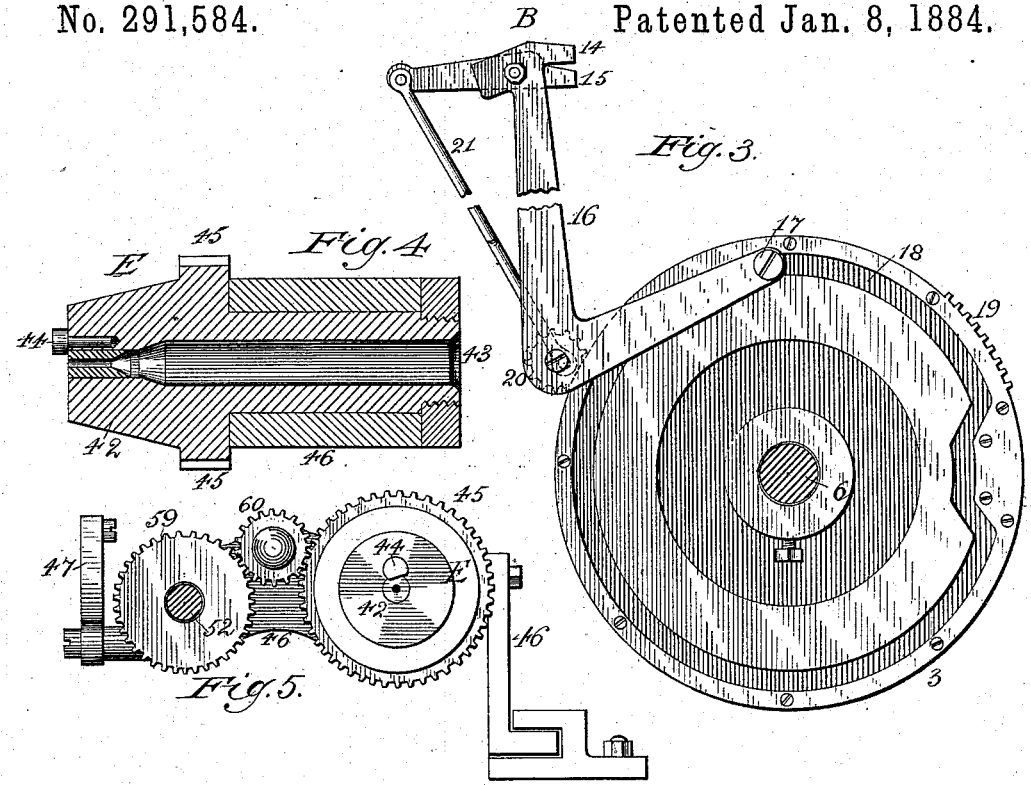
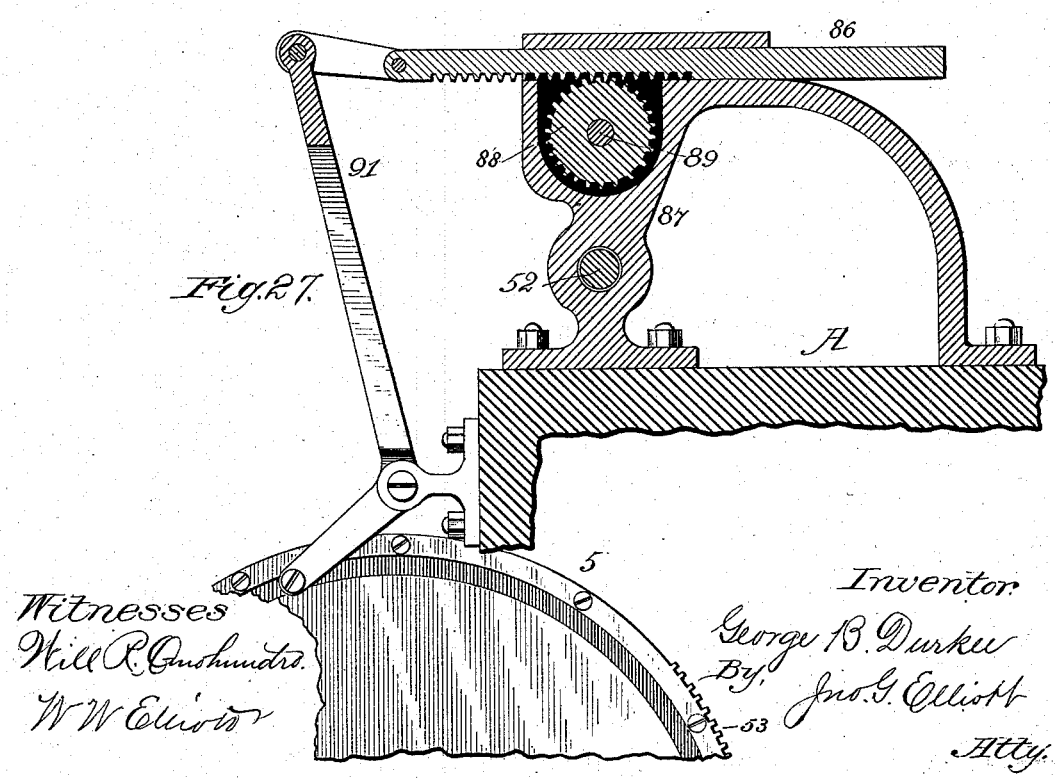
Witnesses
Will R. Cushmundrs.
W. W. Elliott.
Inventor
George B. Durkee
By Jno. G. Elliott
Atty.

(No Model.) 8 Sheets—Sheet 4.
G. B. DURKEE.
MACHINE FOR FORMING CHECK ROWER WIRES.
No. 291,584. Patented Jan. 8, 1884.
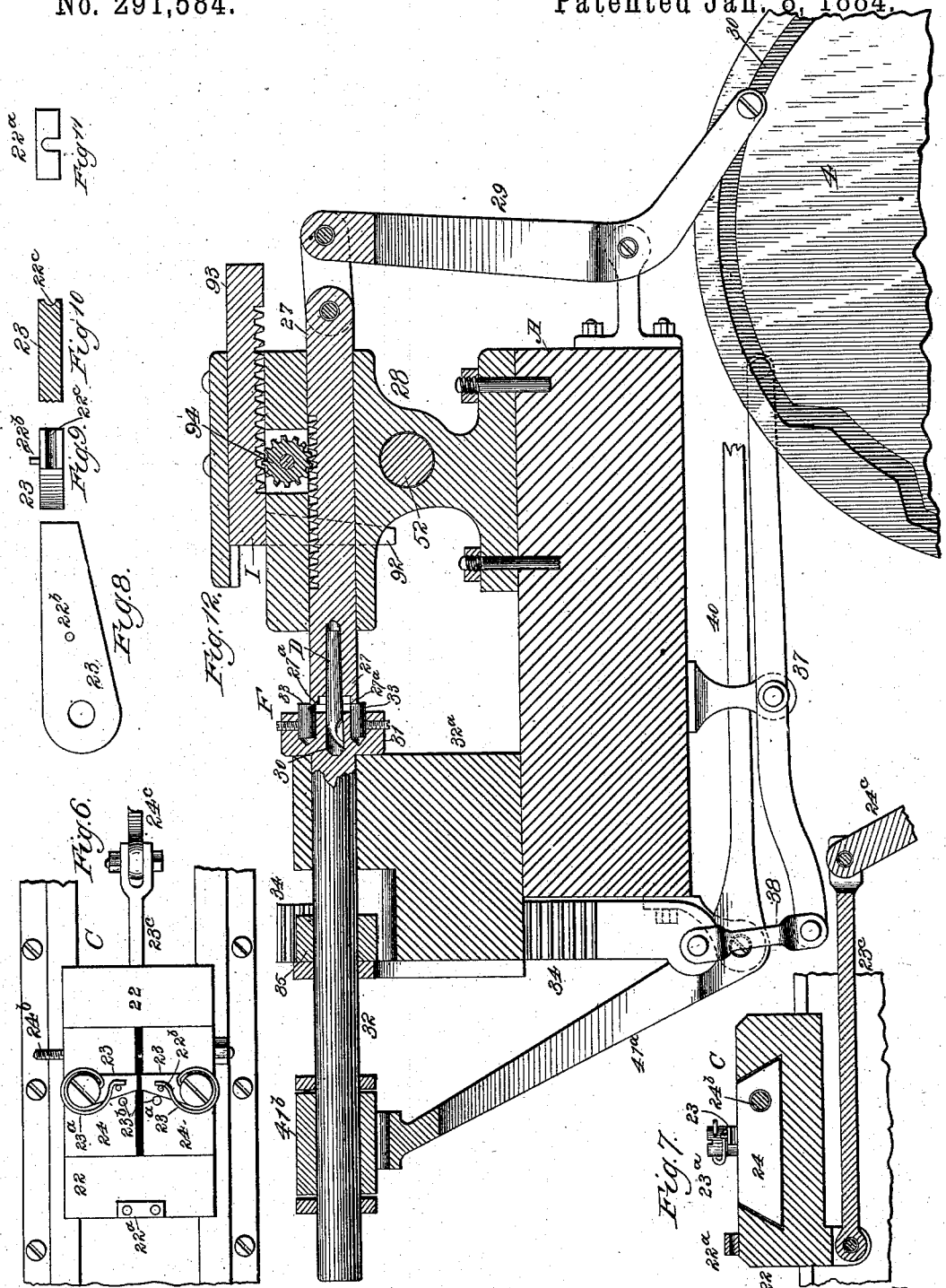

(No Model.) 8 Sheets—Sheet 5.
G. B. DURKEE.
MACHINE FOR FORMING CHECK ROWER WIRES.
No. 291,584. Patented Jan. 8, 1884.
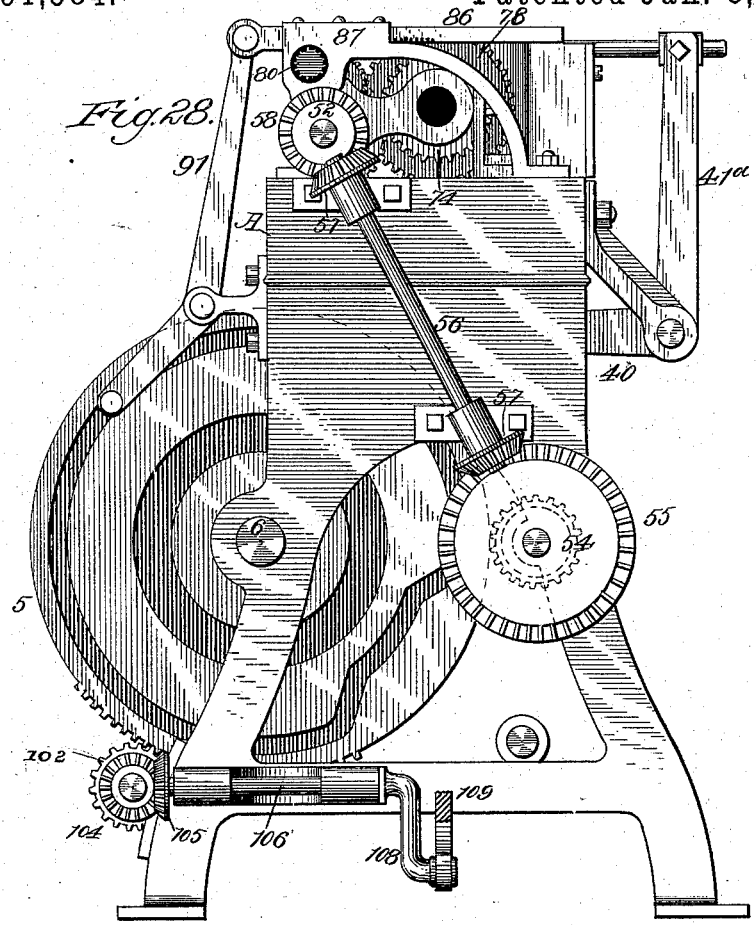
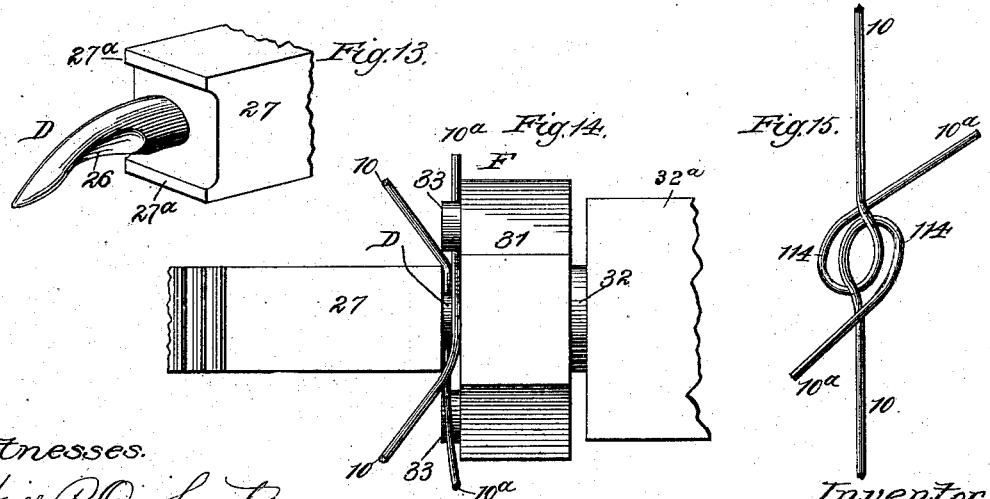
Witnesses.
Will R. Onshundro.
W. W. Elliott.
Inventor
George B. Durkee
By, Jno. G. Elliott
Atty.

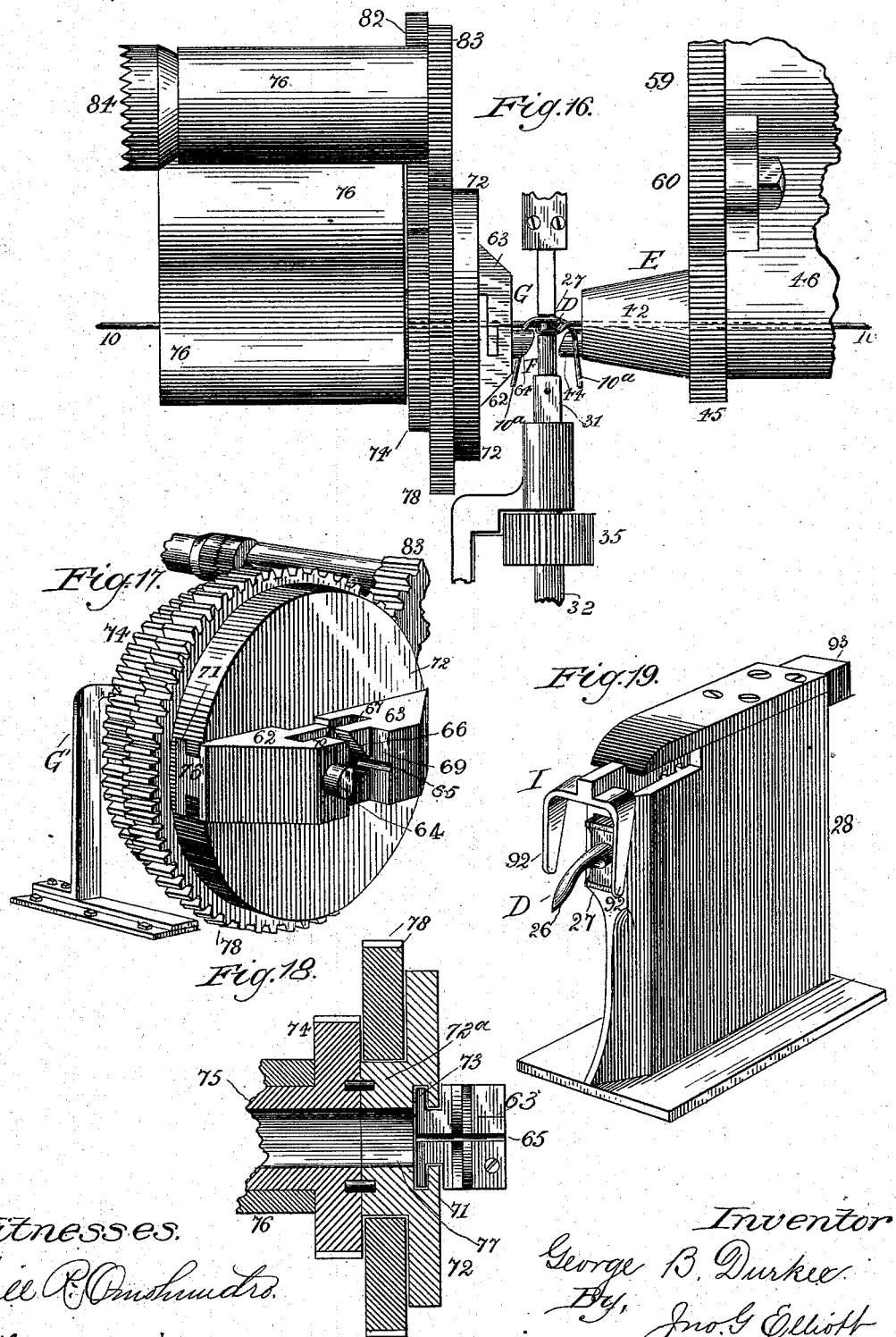

(No Model.) 8 Sheets—Sheet 7.
G. B. DURKEE.
MACHINE FOR FORMING CHECK ROWER WIRES.
No. 291,584. Patented Jan. 8, 1884.
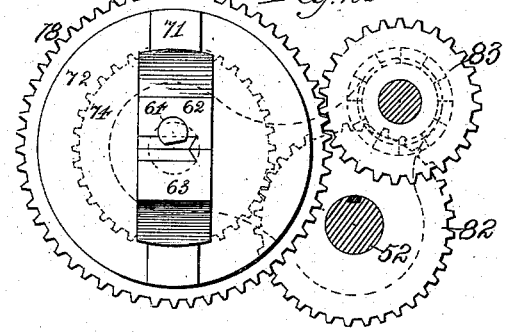
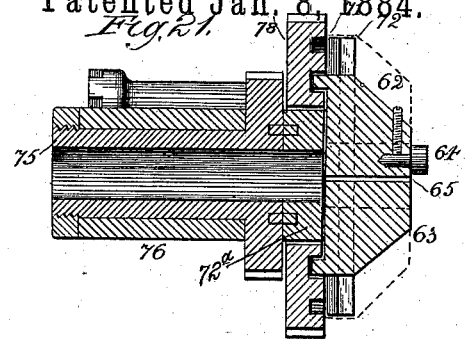
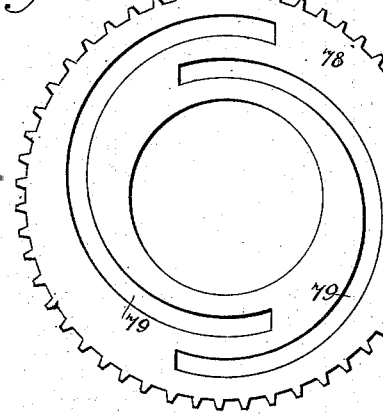
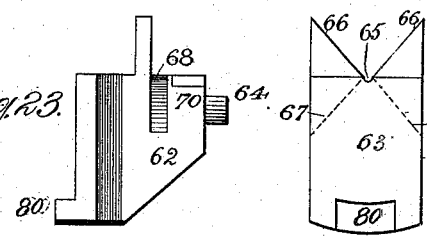
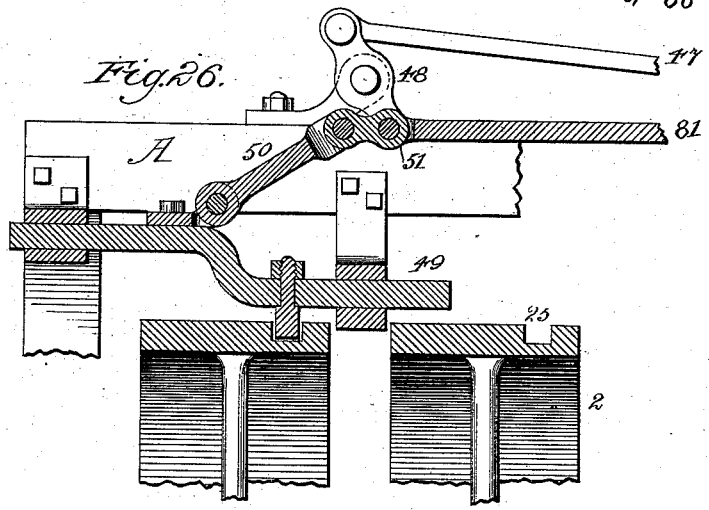
Witnesses.
Will R. Omohundro.
W. W. Elliott
Inventor
George B. Durkee
By Jno. G. Elliott
Atty.

(No Model.) 8 Sheets—Sheet 8.
G. B. DURKEE.
MACHINE FOR FORMING CHECK ROWER WIRES.
No. 291,584. Patented Jan. 8, 1884.
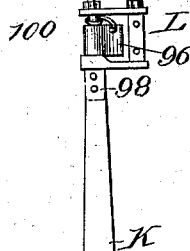
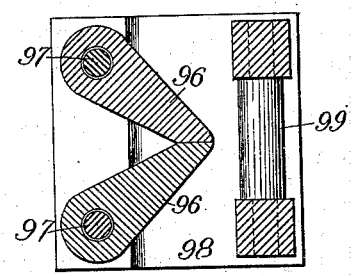
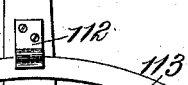
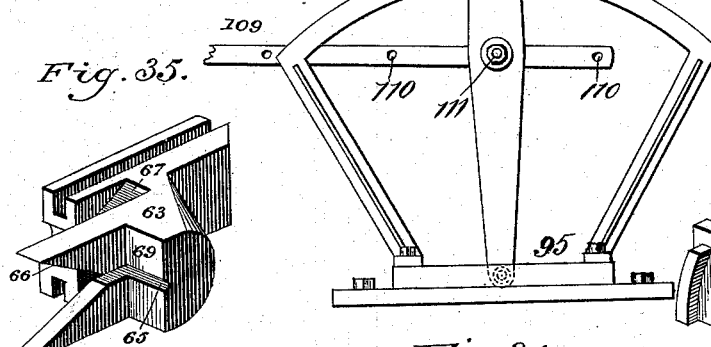
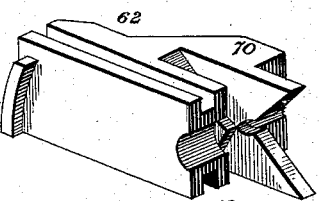
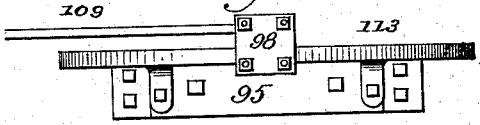
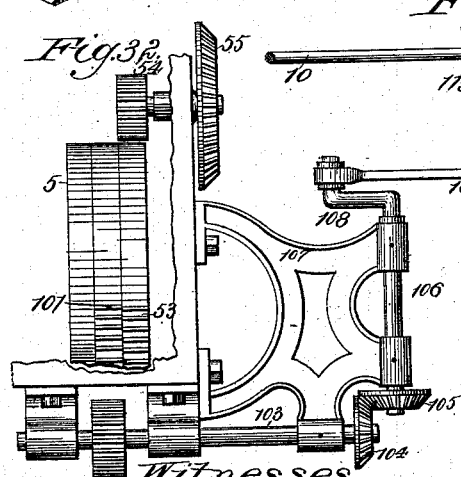
Witnesses.
Will R. Onshundro.
W. W. Elliott.
Inventor:
George B. Durkee
By, Jno. G. Elliott
Atty.
N. PETERS, Photo-Lithographer, Washington, D. C.

UNITED STATES PATENT OFFICE.

GEORGE B. DURKEE, OF CHICAGO, ASSIGNOR TO THE JOLIET WIRE CHECK-ROWER COMPANY, OF JOLIET, ILLINOIS.

MACHINE FOR FORMING CHECK-ROWER WIRES.

SPECIFICATION forming part of Letters Patent No. 291,584, dated January 8, 1884.

Application filed May 28, 1883. (No model.)

*To all whom it may concern:*

Be it known that I, GEORGE B. DURKEE, a citizen of the United States, residing in Chicago, county of Cook, and State of Illinois, have invented certain new and useful Improvements in Machines for Forming Check-Rower Wires, of which the following is a specification.

This invention relates to a machine for form-check-rower wires for check-row planters, and has for its object to provide novel and efficient mechanism for forming checks or shoulders at suitable intervals along a continuous wire as the latter is drawn through the machine.

To such end my invention consists in the features of construction and combination hereinafter described and claimed, and illustrated in the annexed drawings, in which—

Figure 1 is a perspective view of a machine for forming check-row wires in accordance with my invention. Fig. 2 is a top or plan view of the machine. Fig. 3 is a side view of the cutting mechanism. Fig. 4 represents a longitudinal section taken through one of the coilers, which is also adapted to constitute a guide for the wire. Fig. 5 is a front view of said coiler, with a carriage, by which it is supported, and gearing for imparting to it the required rotary movement. Fig. 6 is a top or plan view of the feed mechanism. Fig. 7 is a longitudinal section taken centrally through Fig. 6. Fig. 8 is an enlarged top view of one of the jaws of the feed mechanism. Fig. 9 is an end view of said jaw. Fig. 10 is a section taken longitudinally through a portion of said jaw, and shows the outer grooved end thereof. Fig. 11 is a detail showing a guide for the wire that is carried by the feed-carriage. Fig. 12 is a transverse section taken on a vertical plane through the machine, and illustrates the mandrel, the rotary looper for bending the wire into loops on the mandrel, the stripper, and mechanism for actuating said members, a portion of one of the cam-wheels shown being broken away. Fig. 13 is a perspective view of the mandrel, with a portion of the slide-bar by which it is carried. Fig. 14 is a detail top or plan view, showing the mandrel inserted in the rotary looper, and the wire in position on the mandrel to be bent into connected loops or links. Fig. 15 shows the form of loops as made by said looper. Fig. 16 is a top or plan view of portions of the machine in position for performing the coiling operation, said view including the looper and the two coilers and certain adjuncts. Fig. 17 is an enlarged perspective view of the rotary coiler, that is provided with a pair of movable jaws. Fig. 18 is a section through the principal portions of Fig. 17, said section being taken on a vertical plane between the two jaws. Fig. 19 is a perspective view of the mandrel, the stripper, and a support for the same. Fig. 20 is a face view of the rotary coiler provided with movable jaws, and the gears for actuating the same. Fig. 21 represents a section taken on a vertical line through Fig. 20. Fig. 22 is an enlarged view of the eccentrically-grooved or slotted ring-gear employed for opening and closing the jaws of said coiler. Fig. 23 is a top view of one of the coiler-jaws. Fig. 24 is a rear side view of one of said jaws. Fig. 25 is an end or face view of one of the coiler-jaws. Fig. 26 is a detail sectional view, showing a portion of the mechanism for simultaneously actuating the carriages that carry the coilers E and G, shown in Fig. 16. Fig. 27, Sheet III, is a transverse section taken on a vertical plane through the greater portion of the machine at its delivery end, and principally illustrates a reciprocating rack-bar engaging a pinion employed for transmitting motion to devices for opening and closing the jaws of one of the coilers. Fig. 28 is an end elevation of the delivery end of the machine. Fig. 29 is a side elevation of the vibratory gage-lever and gripping device for drawing the the wire through the machine. Fig. 30 is an enlarged section taken through said gripping device at one side of one of its jaws. Fig. 31 is a section taken on a horizontal plane through the same. Fig. 32 is a detail top or plan view of mechanism for actuating the gage-lever. Fig. 33 is a top or plan view of the gage-lever and its support. Fig. 34 shows a wire with the checks or links and shoulders completed; Figs. 35 and 36, perspectives, on an enlarged scale, of the jaws 62 and 63.

The main frame of the machine consists, essentially, of a strong bed or table, A, mounted upon suitable supports, and adapted to support the principal operative parts of the machine employed for manipulating the wire, so as to form at regular intervals along the latter pairs of connected links or loops, and shoulders back of the same, which shoulders constitute the checks on the wire. The mechanism for intermittingly actuating said operative parts of the machine at the proper moments comprises a series of cam-grooved wheels, respectively numbered 1, 2, 3, 4, and 5, some of which are also constructed to form intermittent gears, as will be hereinafter more definitely referred to. The wheels are fixed upon a rotary shaft, 6, mounted below the table, and driven in any suitable way—as, for example, the shaft can be provided at one end with a large gear, 7, meshing with a pinion, 8, upon a shaft, 9, carrying the usual fast and loose belt-pulleys. The wire 10, as it is drawn through the machine, passes, in the first instance, through a guide, 11, and then between the grooved straightening-rollers 12, preferably arranged in two sets, respectively mounted in different planes on brackets 13, secured upon the table at one end of the machine. The wire is drawn through the entire machine preparatory to being cut by the shears B, the cutting action of which latter may be said to constitute the first of a series of successive steps requisite for forming a check-row wire in accordance with my invention.

The shears B comprise a pair of cutting-jaws, 14 and 15, the former of which is rigid with a bent or bell-crank lever, 16, (see Fig. 3,) that is mounted upon a suitable fulcrum at one side of the machine. One arm of this bent lever carries a stud or roller, 17, received in a cam-groove, 18, formed in the wheel 3, said groove being adapted to vibrate the lever at each revolution of the wheel, so as to first throw the shears forward into position for severing the wire, and then back out of the way. The movable jaw 15 of the shears is pivotally connected with the rigid jaw, and is closed, at the proper moment for severing the wire, by means of a short line of gear-teeth, 19, on wheel 3, adapted to actuate a pinion, 20, (shown in dotted lines,) that is mounted upon the fulcral support of the bell-crank lever 16, and provided with a crank-arm or eccentrically-arranged wrist-pin connected with an arm of the pivoted jaw through the medium of a link or rod, 21. It will be seen that when the gear upon the wheel 3 engages the pinion thus connected with the pivoted jaw of the shears, the rotation of the pinion will cause a reciprocatory movement on the part of the rod or link 21, and hence successively close and open the jaw.

The device for accomplishing the next step in the operation consists of a feed mechanism, C, comprising a slide or carriage, 22, provided with a guide, 22$^a$, for the wire, and carrying a pair of spring-jaws, 23, grooved in their gripping ends or faces, and arranged so that when the wire is drawn through the machine, or the feed-carriage moved back, the frictional contact of the wire with the grooved gripping-faces 22$^c$ of the jaws will open them sufficiently to allow the wire to pass, while any tendency to a forward movement on the part of the feed-carriage carrying the jaws will close and cause them to firmly grip and hold the wire. This arrangement of spring-jaws is best illustrated in Figs. 6 and 7, in which the jaws are shown pivoted upon blocks 24, detachably fitted in a dovetailed seat in the slide or carriage, and adapted to be adjusted toward or away from each other by means of a screw-rod, 24$^b$, whereby the gripping ends of the jaws can be adjusted with relation to the size of wire used. The springs 23$^a$ in this instance are attached to the pivots about which the jaws turn, and also connected with or adapted to bear against small pins 22$^b$ on the jaws, so as to normally hold the latter closed against stops 23$^b$ on the blocks. This feed slide or carriage will be moved forward after the wire has been severed by shears B, so as to feed forward that portion of the wire held by the jaws upon the feed-carriage; and to such end the carriage will be pivotally connected by a link, 23$^c$, with a suitably-arranged bell-crank or other appropriately-shaped lever, 24$^c$, actuated directly by or connected with a lever arranged to be actuated by a cam-groove, 25, in the wheel 2, such arrangement being, however, a mere matter of mechanical skill, and hence is not shown. This forward movement of the carriage, while unreeling the wire from such reel or spool as will, in practice, be employed at or near the feed end of the machine, pushes the terminal of the wire held by the carriage past the opposing terminal of the remaining portion of the wire leading to the delivery end of the machine, so as to bring the two ends of the wires, respectively, above and below the mandrel in position to be crossed, as in Figs. 2 and 14.

The devices for separating and crossing the two ends of the wire, in order to bring them into such position that they can be bent into connected loops, consists of a mandrel or curved finger, D, Figs. 13, 14, and 19, having its upper surface inclined downwardly to its outer end, and in its under side provided with a notch or curved recess, 26. The wire prior to its being cut rests upon the upper side of this mandrel D, which is arranged at a point at one side of the path of the shears, so that after the wire has been severed one end thereof shall be left resting upon the mandrel.

In order to provide for bringing the end of the wire carried by the feed-carriage under the mandrel, as the carriage advances and feeds the wire forward, the guide-passage for the wire in one of the coilers E, (shown in section in Fig. 4,) is arranged, as hereinafter described, so that after the wire has been cut the end thereof projecting from said coiler will drop or incline downwardly, so as to be in position to pass under the mandrel as the carriage is moved forward. The mandrel D is rigid with a horizontal rack-bar, 27, (see Figs. 12 and 14,) arranged to slide in a bracket, 28, that is secured upon the table. This rack-bar, which moves at right angles to the line of wire, is actuated by a bent lever, 29, Fig. 12, having one end pivoted to the rack-bar, and on its remaining end a stud or roller that works in a cam-groove, 30, in the wheel 4. The rack-bar is adapted to be moved forward to such extent that the ends of the wire will be pushed laterally to one side, by reason of the end of the bar pressing against them, and thereby caused to lie in lines that cross each other, as in Figs. 2 and 14, so as to bring such ends in position to be acted upon by the studs or fingers of a rotary looper, F, employed for bending the wire into two connecting eyes or loops. The finger or mandrel D is directly opposite this looper F, which latter is provided with a recess, 30, Fig. 12, in which the mandrel enters as it is moved forward. This looper consists of a head, 31, formed with or secured upon one end of an intermittingly-rotating and longitudinally-reciprocatory shaft, 32, journaled in a bearing, 32$^a$, said head being provided upon its vertical face with a pair of fingers or studs, 33, which serve to bend the two ends of the wire into a pair of connected eyes or loops when the looper is rotated.

In Figs. 2 and 12 the rack-bar is shown moved up closed to the looper, with the ends of the wire between the rack-bar and the face of the looper, upon which the studs or fingers are so arranged that one of them shall stand over one of the wire ends, while the remaining stud or finger shall stand under the other wire end, as best shown in Fig. 14, in which the ends of the wire are in position to be bent around the mandrel so as to form two loops, which will obviously connect with each other, since the wires cross one another, as indicated. The rack-bar is provided at its end which carries the mandrel, and which may be termed its "forward" end, with a pair of short rigid jaws, 27$^a$, preferably formed by recessing the end of the rack-bar, which jaws, after the mandrel has entered the looper, serve to wedge or hold the wires down upon that portion of the mandrel that is exposed between the looper and the end of the rack-bar.

The shaft 32, carrying the looper, is adapted to have an intermittent rotary movement for the purpose of turning the looper sufficiently to form the connected loops shown in Fig. 15, and it is also adapted to have an intermittent longitudinal reciprocating movement, so that after the ends of the wire have been looped together a forward longitudinal movement on the part of shaft 32 will cause the looper to advance simultaneously with a receding movement on the part of rack-bar 27, and thereby carry the looped portions of the wire back into the direct line of feed from which the forward movement of the rack-bar and mandrel originally caused it to deviate. The intermittent rotary movement of shaft 32, carrying the looper, is attained by means of a vertically-sliding rack-bar, 34, arranged to engage a pinion, 35, that is fixed upon the said shaft. This rack-bar 34 is raised and lowered at the proper moments by means of a lever, 37, pivoted to a bracket below the table A, one end of this lever 37 being connected with the rack-bar by means of a link, 38, while the remaining end of the lever carries a stud or pin that works in a cam-groove in wheel 4, said cam-groove (which is not herein shown) being located on the side of the wheel opposite that in which the cam-groove 30, hereinbefore described, is made. The longitudinal reciprocating movement of shaft 32 is derived from a cam-groove, 39, in the wheel 5. (Shown in Fig. 1.) This cam-groove is timed to vibrate at the proper moment a lever, 40, Figs. 1 and 2, actuating a rock-shaft, 41, carrying a bent lever, 41$^a$, Figs. 2 and 12, which carries on the end of its upwardly-extending arm a bearing, 41$^b$, in which the shaft is arranged to turn, and at the same time caused to move back and forth with said bearing when the latter is shifted by the lever 41$^a$. To prevent the shaft from sliding through this sleeve or bearing, and also to cause the shaft to move longitudinally when the bearing is vibrated, the shaft will be provided with two collars, 41$^c$—one at each side of the bearing—or other work-shop expedients for such purpose can be employed.

Fig. 16 illustrates a pair of rotary coilers, brought into position for coiling the ends of the wire around the main line of wire back of the loops, so as to secure said ends, as in Fig. 34. One of the coilers, E, (shown in section in Fig. 4,) constitutes a combined guide and coiler and comprises a rotary shell, 42, formed with an axial bore, 43, through which the wire passes, and it is provided upon its forward end with a stud, 44, for coiling the wire. The bore or passage through this shell is made considerably larger than the wire for the greater portion of its length, and has its smaller portion at the forward end of the shell, upon which latter the stud or pin 44 is fixed for coiling the wire. By setting this shell or coiling device slightly below the level of the jaws on the feed-carriage 22, the wire passing through the shell 42 will be somewhat inclined therein, so that there will be a tendency on the part of the wire projecting from the forward end of the coiler to drop after the wire has been severed by the shears, as hereinbefore described, whereby when the wire is fed forward through shell 42, by the forward movement of carriage 22, preparatory to forming the loops, it will pass under the mandrel, upon which, it will be remembered, the other end of the wire rests after such cut. If preferred, however, the bore through the shell 42 could have a slight inclination for such purpose or other analogous means for guiding the wire under the mandrel devised. The shell 42 of the coiler E, which is rotated at the proper moment, is provided with a gear, 45, and is mounted to revolve in a casting or carriage, 46, arranged to slide in suitable ways and to be moved up to the work, and afterward retracted by a pitman, 47, Figs. 1, 2, and 26, connected with a rocker, 48, which is pivoted to a bracket upon the table. This rocker is actuated from the cam-grooved wheel 1 through the medium of a slide, 49, connected by links 50 and 51, or other suitable connections, with the rocker. The intermittent rotary movement of the coiler E is derived from a shaft, 52, having an intermittent rotary motion imparted to it from a mutilated gear, 53, on wheel 5, which, as shown in Fig. 2, is adapted to engage at intervals a pinion, 54, on a shaft carrying a bevel-gear, 55, (see also Fig. 28,) that drives an inclined rotary shaft, 56, arranged at the delivery end of the machine, and provided with bevel-pinions 57, respectively engaging the bevel-gear 55 and a like smaller gear, 58, upon the shaft 52. The shaft 52 is mounted in suitable bearings upon the main frame or table, and passes through the carriage 46, which also carries a rotary hub provided with a gear, 59, (see Fig. 5,) employed for actuating gear 45 upon the coiler E, through the medium of an intermeshing gear, 60, upon the front end of the carriage. The gear 59 or its hub will be keyed upon shaft 52—as, for example, by means of a key or feather received in a longitudinal groove, 61, Fig. 2, formed in the shaft, whereby while the carriage can slide freely back and forth along said shaft, the gears for actuating the coiler will be set in motion when the shaft is rotated.

As illustrated in Fig. 16, coiler E is in position for coiling one end of the wire in a plane at right angles to that in which the bend to form the loops was given to the wire by looper F, hereinbefore described. In order to coil the remaining end of the wire simultaneously with the action of the coiler E, a coiler, G, is also provided, which, while serving to coil the wire back of one of the loops, is also adapted to open after the completion of the coiling operation, so as to allow the finished loops to pass on to the delivery end of the machine.

Referring to Figs. 16, 17, and 18, and also Figs. 20 to 25, inclusive, in which the coiler and its adjuncts are illustrated, 62 and 63, respectively indicate a pair of sliding jaws, upon the front side of one of which is a pin or stud, 64, for coiling one of the ends of the wire while the loops are held upon the mandrel between rack-bar 27 and looper F, as in Fig. 16. These jaws are adapted to interlock with each other when brought together, and have their faces provided with transverse grooves 65, which, when the jaws are closed, form a passage for the wire. To enable the jaws to thus interlock, each jaw has its face composed of a series of double or V-shaped inclines, successively inclined in reverse directions—that is to say, a jaw will have the apex of one of the V-shaped portions of its face projecting outwardly from the jaw, while the walls or faces of the next V-shaped incline will converge inwardly, so as to constitute a V-shaped recess in the jaw—as, for example, jaw 63 will have a V-shaped notch formed in its face, so as to provide inclines 66, which converge inwardly, and, next in succession, a pair of outwardly-converging inclines, 67, which are set back in the jaws, as shown in Fig. 25. The inclines of jaw 62 will be formed the reverse of those of jaw 63—as, for example, inclines 68, one of which is shown in Fig. 23, are adapted, when the jaws are closed, to enter the first V-shaped notch or recess shown in jaw 63, and fit against the inclines 66, formed by such notch. One of the jaws is also preferably recessed to provide a shoulder, 69, while the opposite jaw will have a portion, 70, adapted to meet said shoulder. This particular conformation of the faces of the jaws is not, however, essential to my invention, and it will be obvious that various other forms could be provided, it being only requisite that when the jaws are closed the wire can pass through a passage formed between them and made larger than the wire, and that the coiler which comprises such jaws shall be free to rotate without effecting torsional strain upon the wire passing through the said jaws. It will be understood from the foregoing that the faces of these jaws are each composed of alternate V-shaped projections or teeth and V-shaped recesses, the tooth-shaped portions of one jaw being arranged so as to fit in the recessed portions of the opposite jaw when the jaws are brought together. As it is necessary to provide a straight passage for the wire between the jaws when the latter are closed, and thereby prevent the wire from being bent, the faces of the jaws are formed so that on each jaw the apex of the tooth-shaped portion shall be in line with the angle of its notched portion or portions; and hence, by forming a groove, 65, transversely across each jaw through the apices and angles of said projections and recesses, these said grooves will, when the jaws are brought together, register with each other and form a straight passage for the wire. The jaws are supported and adapted to slide in a dovetail groove or grooves, 71, formed diametrically through the face portion of a plate or disk, 72, each one of the said jaws being provided upon its rear side with a tongue or dovetailed rib, 73, which works in the groove in the disk. This disk is provided upon one side with a hub, $72^a$, Fig. 18, and rigidly connected in any suitable way with a gear, 74—as, for example, by means of a pin or pins, or by a bolt or screws—so that when the said gear is rotated the jaws will be turned for the purpose of causing stud 64 on one of the jaws to act upon one of the ends of the wire back of a loop, and to thereby coil or wind such end around the wire back of said loop. The gear 74 is formed upon or rigid with a hub, 75, fitted to turn in a casting or carriage, 76, arranged to move back and forth over the table, and means, that will be hereinafter described, are employed for moving the said carriage and for rotating the said gear at the proper moment, so as to cause the coiler G to revolve simultaneously with and in a reverse direction to the coiler E. The wire passing between the jaws of coiler G is carried on through the hollow hub 75, which is provided with gear 74, and is thence conducted to a gage-lever, that will in practice be located at a point beyond the delivery end of the machine. To admit of the loops or links in the wire being drawn through the coiler after the coils have been completed, the disk 72 is provided with a central opening, 77, corresponding in size to the diameter of the bore through hub 75, whereby, after the jaws have been opened, the loops can be drawn through the disk and the hub.

The means for opening the jaws consist of a ring-gear, 78, fitted loosely so as to turn upon the hub of disk 72, that carries the jaws. This ring-gear is provided with eccentric grooves or slots 79, arranged substantially as shown in Fig. 22. Each one of the coiler-jaws 62 and 63 is provided with a lug, 80, that works in one of these slots in the ring-gear, so that when the disk upon which the jaws slide is held stationary and the ring-gear rotated the jaws will be forced apart or brought together, according to the direction in which the ring-gear is turned.

The means employed for reciprocating the carriage 76, for rotating the coiler G, and for successively rotating the ring-gear in reverse directions, so as to open and close the jaws, is as follows: The carriage 76 is connected by a connecting-rod, 81, Fig. 1, with one arm of the rocker 48, Fig. 26, which has its remaining arm connected by a pitman with the carriage provided for coiler E; and hence when said rocker is vibrated the carriages 46 and 76 will be moved in reverse directions, and their respective coiling devices either brought toward each other up to the work, or be caused to recede, as may be required. The gear 74, employed for intermittingly rotating coiler G, is driven by a gear, 82, rigid upon a hub or sleeve, 82$^a$, Fig. 2, that is carried by and arranged to rotate in carriage 76. The intermittingly-rotating shaft 52, employed for actuating coiler F, as hereinbefore described, is also employed for rotating coiler G, through the medium of gears 82 and 74, and to such end gear 82 or its hub will be keyed upon the shaft 52, so that while it will partake of the rotation of the latter it shall be free to slide thereon as the carriage is propelled forward or backward. The ring-gear 78 is turned for the purpose of opening or closing the jaws of coiler G, by means of a gear, 83, upon a spindle, which is mounted to rotate in a portion of the carriage 76, and provided at one end with one of the halves 84 of a clutch, H. One half, 85, of the clutch is permanently located at a point near the delivery end of the machine, and is intermittingly turned, when the said two halves are in clutch, by means of a transversely-arranged rack-bar, 86, Figs. 1, 2, and 27, which slides in a support, 87, upon the table or main frame, and actuates a gear, 88, fixed upon a spindle, 89, that passes through a support, 90, and carries the part 85 of the clutch. This rack-bar 86 is reciprocated at the proper moments by means of a lever, 91, Fig. 27, that is pivoted to a suitable support on the main frame, and actuated by a cam-groove in the wheel 5.

It will be seen farther on in this specification that when the carriage 76 is back at the delivery end of the machine the two parts of the clutch are in engagement with each other, and rotated so as to turn the ring-gear for the purpose of opening and closing the jaws, according to the direction in which the clutch is rotated. During such operation the shaft 52, from which plate 72, carrying the jaws, derives its motion through the intermediate gears, is inactive. When therefore shaft 52 is not being operated, it would apparently hold the plate or head carrying the jaws against rotation. I have found, however, that during the rotation of the slotted ring-gear, and consequent operation of the jaws, further means are required for holding the head carrying the jaws against rotation; and to such end I provide upon the main frame of the machine, near its delivery end, a stop, G', which consists of a rod or standard secured by a base-plate to the main frame, and having at its upper end a bent arm or analogous projection, which, when the carriage is back, will be received in a recess in one of the sides of the gear, that is rigidly connected with the head upon which the jaws are carried.

The stripper I, (see Figs. 12 and 19,) for throwing the loops off from mandrel D' after their completion, consists of a pair of fingers, 92, projecting downwardly from a rack-bar, 93, arranged to slide in bracket 28 above the rack-bar 27. The rack-bar carrying the stripper is actuated by a pinion, 94, arranged between the said rack-bar and the lower rack-bar, 27, that carries mandrel D, whereby when the lower rack-bar is moved forward and the mandrel advanced the stripper will be moved backward in a reverse direction, and, conversely when the mandrel is retracted, the stripper and its rack-bar will be advanced, so as to push the links or loops off from the mandrel.

K denotes a vibratory gage-lever for drawing the wire through the machine to the required extent after the completion of each pair of connected links, whereby the links, with the shoulders formed by the wire ends coiled around the wire back of the links, can be made at regular and requisite intervals along the wire. This throw or vibratory gage-lever, which will be arranged in an upright position at a point beyond the delivery end of the machine, is pivoted at its lower end to a suitable base, 95, and at its upper end is provided with a gripping mechanism, L, adapted to grip the wire when the lever is swung away from the machine, so that while the said movements on the part of the jaws shall draw the loops or links previously made from the machine, a reverse movement will release, and hence not affect or push back, the wire. This gripping and releasing mechanism consists of a pair of converging spring-jaws, 96, Figs. 30, 31, hung upon pintles 97, that are fixed in a frame, 98, secured upon the lever K. This frame also carries a pair of transverse rods or rollers, 99, between which the check-row wire passes after passing between the jaws. From the arrangement of these jaws it will be seen that when the lever is swung one way they will tightly grip the wire, and that when the lever is swung in a reverse direction the contact of the jaws with the wire will open the former against the springs 100, and thus allow the jaws to pass along the wire while the latter remains stationary. This lever is operated from a mutilated gear, 101, on wheel 5, which meshes at the proper moment with a pinion, 102, fixed on a rotary shaft, 103, that carries at one end a bevel-gear, 104. This bevel-gear engages a like bevel-gear, 105, on one end of a shaft, 106, which is mounted in a bracket, 107, attached to the main frame of the machine, the opposite end of said shaft being formed or provided with a crank, 108, that is connected with the lever K by a connecting-rod, 109. This connecting-rod is adjustably connected with the lever, so that the extent to which the wire is drawn through the machine, and consequently the distance between the pairs of links, can be varied. This adjustable connection between the rod and lever can be effected by providing the rod with a series of holes, 110, through one of which a bolt, 111, connecting the rod to the lever will be passed. As a means for guiding and steadying the gage-lever, it is provided with a finger or guide, 112, which laps over a segment-frame, 113, alongside of which the lever vibrates.

Fig. 34 shows a pair of completed loops or links, 114, with the ends of the wire twisted round the main line of wire back of the loops, so as to form shoulders 115, against which the tripping device or other required part of the seed-drill will strike after the check-row wire thus constructed has been stretched across the field.

The general operation of the machine is as follows: The wire being drawn from a spool or reel through the machine, and carried onto and caught by the grippers of the gage-lever, and power applied, the shears swing forward and sever the wire at a point between the combined guide and coiler E and the mandrel D, upon which latter the wire rests. After the wire has been cut, the shears open and swing back to their first position, and the feed-carriage of the feed mechanism C moves forward, so as to pass the end of the wire extending forward from the guide and coiler E, under the recessed portion of the mandrel, whereby one end of the wire will be above and the remaining end below the same. The rack-bar carrying said mandrel then advances in a line at right angles to the line of feed, and as the mandrel enters the recess in the rotary looper F the ends of the wire are pushed away laterally from the line of feed primarily occupied by the wire, and the wires thereby crossed, as in Figs. 2 and 14. As soon as the mandrel has well entered the looper and the wires are held upon the mandrel between the jaws or shoulders on the rack-bar 27 and the face of the looper, the looper F turns, so as to bend the wire into the two connected loops or links shown in Fig. 15, in which it will be seen that a sufficient portion, $10^a$, of each end of the wire is left beyond each loop for coiling around the main line of wire back of the latter. The feed mechanism and mandrel D now recede and the looper F advances, so as to bring the wire back again into the line of feed, and hence in position to be acted upon by the devices for coiling the ends of the wire around the main line of wire back of the loops. The two carriages 46 and 76 move toward each other, so as to bring them up in position for coiling the wire, and as the carriage carrying the coiler G and one part of the clutch advances said part of the clutch will be disengaged from the permanently-located portion of the clutch. The carriages 46 and 76 continue to advance toward each other until the studs on the coilers are in position to engage the projecting terminals $10^a$ of the wire, as in Fig. 16. These coilers E and G then rotate in reverse directions, so as to wrap the ends of the wire around the main line back of the loops, as in Fig. 34. After the coils have been made, and the rotation of the coilers stopped, the carriages carrying the coilers move apart and recede to their first positions. When the carriage 76, carrying coiler G, reaches the limit of its back movement, the section 84 of the clutch engages the permanently-located clutch-section 85, so that when the clutch is rotated the loose ring-gear 78, engaging the jaws of coiler G, will be turned and the jaws opened. The shaft 52 is now stationary, and said shaft, together with the gears connecting the same, will be prevented from any accidental movement during the rotation of the ring-gear, by reason of the stop G', which, when the carriage has reached its back position, engages the gear 47, that is attached to the rotary head or plate carrying the jaws. Said head being now held stationary, the clutch is rotated, by reason of a sliding movement on the part of rack-bar 86, and, through the medium of gear 83, rotates the ring-gear of the coiling mechanism at this end of the machine, so that the jaws 62 and 63, having their rearwardly-extending lugs received in the eccentric grooves in said ring-gear, will be caused to slide upon the now stationary disk 72, and hence open so as to open the passage 77 for the completed links. The looper F now recedes from the mandrel, and the stripper I moves forward and pushes the links or loops off from the latter, after which an impulse is given to the gage-lever K, whereby the wire is pulled forward to the required extent, and the pair of connected links consequently drawn between the jaws of coiler G, and thence through the hollow hub 75 of gear 74, and out beyond the delivery end of the machine. After this operation, the ring-gear 78 is rotated in a reverse direction to its previous revolution, by reason of a reverse movement on the part of rack-bar 86, and mechanism intermediate of said rack-bar and ring-gear, whereby the jaws of coiler G will close, and thereby bring the stud upon one of them into position for the next twisting operation. After this the shears are brought into action, as before, and the foregoing operation repeated.

In conclusion, it may be observed that numerous changes might be made in the means employed for timing the several operative parts of the machine—as, for example, a fewer number of wheels could be employed, and the position and shape of the levers that are directly actuated by the same considerably varied. Nor do I limit myself to the specific construction of devices which I have shown and described for effecting each step or successive operation upon the wire, for my invention includes a machine having, in organized combination, devices capable of successively and automatically effecting the successive operations necessary to make the product herein shown and described.

Having thus described my invention, what I claim, and desire to secure by Letters Patent, is—

1. In a machine for forming check-row wire, the combination of means for intermittingly feeding the wire, means for severing the wire into parts, means for feeding forward one part to cross the ends of the parts, means for bending said ends into connected loops, and means for coiling the terminals of the parts around the main line of the wire back of the links, to form a check or shoulder, substantially as shown and described.

2. The combination, in a machine for forming check-row wire, of mechanisms for cutting and bending the wire at intervals into pairs of connected loops, with means for intermittingly actuating the cutting and bending or looping devices, substantially as described.

3. The combination, in a machine for forming check-row wire, of a mandrel upon which the wire rests preparatory to forming loops in the same, a cutting mechanism for severing the wire at one side of the mandrel, and a feed mechanism adapted to pass one end of the cut wire under the mandrel, while the opposing end of the wire is upheld by the latter, substantially as described.

4. In a machine for forming check-row wire, the cutting mechanism consisting of a pair of shears constructed with a jaw rigid upon an intermittingly-vibrating lever, and a pivoted jaw connected by a link with a crank-pin upon a rotary gear, intermittingly rotated in order to open and close the pivoted jaw, substantially as described.

5. The combination, in a machine for forming check-row wire, of a combined cam-grooved and mutilated gear-wheel, with the vibratory lever actuated by the cam-groove in said wheel, and carrying a fixed cutting-jaw, with the pivoted cutting-jaw connected by a link with a crank-pin upon a pinion that is actuated by said mutilated gear, substantially as described.

6. The combination, in a machine for forming check-row wire, of the mandrel upon which one end of the wire rests after it has been severed, and a feed-carriage provided with spring-jaws, by which the wire is grasped and the remaining end pushed forward under the mandrel, substantially as described.

7. The combination, in a machine for forming check-row wire, of a mechanism for cutting the wire at intervals along its length, with an intermittingly-reciprocating mandrel, by which the adjacent ends of the wire are pushed to one side and crossed after the wire has been severed, an intermittingly-rotating looper, located and adapted to bend said crossed ends of the wire into connected loops or links upon the mandrel, substantially as described.

8. The combination, in a machine for forming check-row wire, of a mandrel with a rotary and reciprocating looper for bending the wire into connected loops upon the mandrel, and means for automatically and successively reciprocating and rotating the looper, substantially as described.

9. The combination, with the intermittingly-reciprocating mandrel, of the intermittingly-rotating looper, provided with a recess adapted to receive the mandrel, and means, substantially as described, for advancing the looper when the mandrel is retracted, for the purpose specified.

10. The combination, in a machine for forming check-row wire, of the looper F, fixed upon a rotary and slidable shaft, with a vertically-reciprocatory rack-bar engaging a gear upon said shaft for rotating the same, and a vibratory lever for imparting a longitudinal movement to the shaft, in order to advance or retract the looper, sustantially as described.

11. The combination, with the intermittingly-rotating looper F, of the mandrel D, carried by a slidable bar, 27, and an intermittingly-vibrating lever for actuating said bar, whereby the mandrel shall be advanced and retracted, substantially as described.

12. The combination, in a machine for forming check-row wire, of means for bending the wire into a pair of connected loops upon a mandrel, with a pair of intermittingly-rotating coilers adapted to coil the ends of the wire around the main line of wire back of the loops, and mechanism for automatically operating the coilers after the loops have been formed, substantially as described.

13. The combination, in a machine for forming check-row wire, of a mandrel and looper adapted to bend the wire into connected loops upon the mandrel, a pair of rotating coilers adapted to rotate in planes at right angles to the plane of rotation of the looper that serves to form the loops, and mechanism, substantially as described, for automatically and intermittingly rotating the said pair of coilers in reverse directions, substantially as described.

14. The combination, in a machine for forming check-row wire, of a mandrel upon which the wire is bent into connected loops, with a pair of coilers intermittingly rotating in reverse directions, and a mechanism for automatically and simultaneously advancing said coilers into position to coil the wire upon itself back of the loops, and for retracting said coilers after the coils have been perfected, substantially as described.

15. The combination, in a machine for forming check-row wire, of a pair of carriages, each carrying a rotary coiler, with means for causing said carriages to move simultaneously in reverse directions, and mechanism for automatically and simultaneously rotating the coilers in reverse directions, substantially as described.

16. The rotary coiler E, mounted in a slidable carriage, and connected by gearing with an intermittingly-rotating shaft, upon which the carriage moves, substantially as described.

17. In a machine for forming check-row wire, a rotary coiler having a pair of jaws adapted to open in order to allow the checks formed in the wire to pass through the coiler after the completion of the coiling operation, substantially as described.

18. The combination, with the sliding jaws of a rotary coiler, of a ring-gear provided with eccentric grooves or slots, in which lugs upon the jaws are received, and devices for intermittingly rotating said ring-gear in reverse directions, and a device for holding the jaws against rotation during the action of the ring-gear, substantially as described, whereby said jaws shall be alternately opened and closed, for the purpose set forth.

19. The combination, with the rotary coiler-jaws, of an intermittingly-rotating disk, upon which the jaws slide, and means, substantially as described, for opening and closing the jaws between the intervals of rotation of the disk by which the jaws are carried, for the purposes set forth.

20. The rotary coiler provided with a pair of interlocking jaws, 62 63, one of which carries a pin for bending the wire, said jaws being formed with transverse grooves in their faces, which, when the jaws are closed, form a passage for the wire, substantially as described.

21. The combination, with the rotary coiler-jaws, of a disk, upon which said jaws slide, connected with a hollow hub provided with a gear, an eccentrically slotted or grooved ring-gear engaging the jaw and loosely mounted upon a hub of the said disk for opening and closing the jaws, and means for rotating all of said members in order to coil the wire, and means for solely rotating the ring-gear after such operation, in order to open and close the jaws, substantially as described.

22. The rotary coiler-jaws 62 63, provided upon their rear sides with ribs, which are received in dovetailed grooves in an intermittingly-rotating disk, and also provided with lugs, which are received in grooves eccentrically formed in a rotary ring-gear adapted to turn independently of the disk, substantially as described.

23. The combination of the rotary coiler, comprising jaws, with mechanism for successively opening and closing the jaws between the intervals of rotation of the coiler, and the stop G', for locking the coiler while the jaws are being opened and closed, substantially as described.

24. The combination, in a machine for forming check-row wire, of a reciprocating carriage supporting a rotary hub provided with a gear and connected to a disk or head carrying a pair of slidable jaws, with means for opening and closing the jaws, and an intermittingly-rotating shaft, and a gear carried by the carriage and actuated by said shaft, for rotating the coiler, substantially as described.

25. The combination, in a machine for forming check-row wire, of means for forming connected pairs of loops along a continuous wire, with an intermittingly-rotating coiler provided with a pair of jaws that are opened after the loops have been formed in the wire, to admit of the latter being drawn through said coiler to the delivery end of the machine, with a rotary clutch, a mechanism which is adapted to actuate the jaws of the coiler, and means for rotating said clutch in reverse directions, whereby said jaws are successively opened and closed, substantially as described.

26. The combination, with the rotary coiler provided with a pair of jaws and carried by a reciprocating carriage, of the rotary clutch H, and mechanism connecting the clutch and jaws, the clutch H comprising two sections, one of which is carried by the reciprocating carriage, and the other permanently located upon the machine, and mechanism timed to intermittingly rotate the permanently-located section of the clutch successively in reverse directions, when the two sections of the clutch are in engagement with each other, whereby the jaws of the coiler shall be successively opened and closed, substantially as described.

27. The combination, with the rotary coiler G, adapted to be moved up to the work and then retracted, of the intermittingly-rotating connecting mechanism, whereby the rotation of this part operates the jaws, clutch H, and the reciprocating rack-bar engaging a pinion connected with another part of said clutch, for rotating the clutch in reverse directions, substantially as described.

28. The combination, with the intermittingly-rotating shaft 52, of the reciprocating carriages, each provided with a wire-coiling mechanism actuated from said shaft, and the pitmen connecting said carriages with the arms of a rocker, whereby when the rocker is vibrated the carriages shall be moved in reverse directions, substantially as described.

29. The combination, in a machine for forming check-row wire, of the mandrel upon which the wire is bent into loops, with a stripper, and means for advancing the stripper to push the completed loops off the mandrel, substantially as described.

30. The combination, with the mandrel upon which the wire is formed into loops, the retracting-bar, and means for actuating the same, of a stripper, which is advanced by said retraction-bar, substantially as described.

31. The combination, with the slidable rack-bar carrying a mandrel upon which the wire is bent into connected loops, of a rack-bar carrying the stripper, and a pinion intermediate of and engaging said rack-bars, substantially as described.

GEORGE B. DURKEE.

Witnesses:
W. W. ELLIOTT,
JNO. G. ELLIOTT.